US008948589B2

(12) United States Patent
Smith et al.

(10) Patent No.: US 8,948,589 B2
(45) Date of Patent: Feb. 3, 2015

(54) APPARATUS AND METHOD FOR TESTING FIBERS IN A PON

(75) Inventors: Joseph L. Smith, Fuquay Varina, NC (US); Ronald Heron, Riguad (CA)

(73) Assignee: Alcatel Lucent, Boulogne-Billancourt (FR)

( * ) Notice: Subject to any disclaimer, the term of this patent is extended or adjusted under 35 U.S.C. 154(b) by 364 days.

(21) Appl. No.: 13/436,243

(22) Filed: Mar. 30, 2012

(65) Prior Publication Data
US 2013/0259469 A1 Oct. 3, 2013

(51) Int. Cl.
*H04B 10/08* (2006.01)
*H04B 10/00* (2013.01)

(52) U.S. Cl.
USPC ............ 398/21; 398/17; 398/98; 398/99

(58) Field of Classification Search
CPC ...................................... H04B 10/071
USPC ................. 398/21, 17, 98, 99, 100
See application file for complete search history.

(56) References Cited

U.S. PATENT DOCUMENTS

| 5,285,305 A * | 2/1994 | Cohen et al. ............. 398/31 |
| 2002/0063924 A1* | 5/2002 | Kimbrough et al. ......... 359/125 |
| 2005/0002628 A1* | 1/2005 | Rahman et al. ............. 385/129 |
| 2007/0122157 A1* | 5/2007 | Vandewege et al. .......... 398/141 |
| 2009/0080880 A1* | 3/2009 | Lee et al. ............. 398/14 |
| 2011/0013904 A1* | 1/2011 | Khermosh et al. .............. 398/16 |
| 2012/0039598 A1* | 2/2012 | Dahlfort ................. 398/13 |
| 2013/0148109 A1* | 6/2013 | Bei et al. .................. 356/73.1 |

FOREIGN PATENT DOCUMENTS

WO WO 2012024977 A1 * 3/2012

OTHER PUBLICATIONS

Hilbk et al., "High Capacity Upgrade of a PON by Means of Wavelength-Routers and WDM Techniques", 1997, The Institution of Electrical Engineers, Mar. 1-Mar. 5.*

* cited by examiner

*Primary Examiner* — Daniel Dobson
(74) *Attorney, Agent, or Firm* — S. Wyse

(57) ABSTRACT

A manner of providing for testing of access fibers in a PON (passive optical network) using OTDR (optical time-domain reflectometry). According to the invention, a PON includes an optical splitter module having one or more optical couplers that combines downstream light from 1×N optical splitter directing the output of an OLT (optical line terminal) and a cyclic AWG (arrayed waveguide grating) for transmission toward one or more ONUs (optical network units). The splitter module is preferably formed on a single semiconductor chip, such as a PIC (photonic integrated circuit) chip and may reside in an outside plant of the PON.

20 Claims, 7 Drawing Sheets

APPARATUS AND METHOD FOR TESTING FIBERS IN A PON

TECHNICAL FIELD

The present invention relates generally to the field of passive optical networks, and, more particularly, to an apparatus and method for assessing whether fibers in a PON (passive optical network), especially access fibers, have suffered breaks, discontinuities or degradation.

BACKGROUND

The following abbreviations are herewith defined, at least some of which are referred to within the following description of the state-of-the-art and the present invention.
AWG Arrayed Waveguide Grating
CO Central Office
OLT Optical Line Terminal
ONT Optical Network Terminal
ONU Optical Network Unit
OTDR Optical Time Domain Reflectometry
PIC Photonic Integrated Circuit
PLC Planar Lightwave Circuit
PON Passive Optical Network A PON (passive optical network) is often employed as an access network or (from a different perspective) as the access portion of a larger communication network. Large communications networks generally have a high-capacity internal or core portion where data or information associated with, for example, television, telephone service, or Internet access is carried across great distances. The core network may also have the ability to interact with other networks to complete telephone calls, enable other two-way or multi-party communications, or request and receive content for delivery to individuals or business subscribers.

The access portion of a communications network, which may also be referred to as an access network, extends from the core or core portion of the network to individual subscribers, such as those associated with a residence or small business location. Access networks may be wireless access, such as a cellular telephone network, or fixed access, such as a PON or cable network. The access network typically though not necessarily ends at a demarcation point on or near the outside of a subscriber premises.

In a PON, as the name implies, optical fibers and interconnecting devices are used for most or all of the communication through the extent of the access network. While only recently it was relatively unusual for an individual residence to be served by an optical fiber, it is now common and may soon become nearly universally available. The basic components of a typical PON are shown in FIG. 1.

FIG. 1 is a simplified schematic diagram illustrating selected components of a typical PON 100 according to the existing art. ONTs (optical network terminals) 115a through 115n are devices typically found on the outside of subscribers' homes or other premises. As the ellipsis in FIG. 1 implies, there may be any number of such devices in a PON that are associated with a single optical splitter. The optical fibers connecting the splitter to the ONTs it serves are generally referred to as access (or "drop") fibers. The optical splitter is typically located in a street cabinet or similar structure with many other optical splitters (not shown for clarity), each serving their own set of ONTs or other ONUs (optical network units). (An ONU may also be a terminal device that serves many subscribers, such as at an apartment building. The term ONT is usually applied to a single-subscriber device.)

In the exemplary PON 100 of FIG. 1, an OLT (optical line terminal) 105 interfaces with a core network (not necessarily using optical signals). In this capacity, OLT 105 forms the optical signals for transmission downstream to ONTs 115a through 115n along a feeder fiber to optical splitter 110. Optical splitter 110 is typically a passive device that simply distributes the signal received from OLT 105 to all the ONTs it serves. Each ONT is then responsible for selecting the portions of the transmitted signal that are intended for its subscriber and passes them along. Other portions of the transmitted signal are simply discarded.

Upstream transmissions from ONTs 115a through 115n are often transmitted in bursts according to a schedule provided to each ONT. In this way, none of the ONTs 115a through 115n send upstream transmissions at the same time. In most applications, upstream transmissions are less frequent than those in the downstream direction and so having to wait for an assigned time slot does not affect upstream performance too significantly. Upstream and downstream transmissions are often sent using different wavelengths of light so as not to interfere with each other.

During PON operation, it is often desirable to assess the integrity of some or all of the fibers, such as the feeder fiber and access fibers shown in FIG. 1. Fibers often extend for some distance and may not be readily accessible. When a fiber break occurs, it may be difficult to detect and localize. Even if a visible inspection is possible, not all breaks or other problems will be readily apparent. Current methods of inspection often focus on and are more accurate with regard to the feeder portion of the line. A solution is therefore needed that can efficiently test the access fibers for breaks or other degradation so that appropriate repairs may be quickly made.

Accordingly, there has been and still is a need to address the aforementioned shortcomings and other shortcomings associated with assessing the integrity of PON fiber optic lines, especially the access fibers. These needs and other needs are satisfied by the present invention.

SUMMARY

The present invention is directed at a novel PON configuration advantageous for testing of the access (or "drop") fibers in a PON (passive optical network). It is expected though not required that this manner of testing will in most implementations be more reliable and less costly than testing schemes currently in use. The present invention makes use of OTDR (optical time-domain reflectometry) testing in this novel configuration with the goal of alleviating some of the disadvantages associated with existing applications.

In one aspect, the present invention is a splitter module for a PON (passive optical network) including an optical splitter, a cyclic AWG (arrayed waveguide grating), and at least one WDM coupler for optically coupling an optical splitter communication link and a cyclic AWG communication link, wherein the at least one WDM coupler is situated downstream of both the optical splitter and the cyclic AWG. The splitter module may be further defined to include a feeder-side WDM coupler situated upstream of both the optical splitter and the cyclic AWG for distributing light propagated along a feeder fiber to the optical splitter and the cyclic AWG, and an OTDR transmitter comprising a light source. In some embodiments, the light source is tunable, for example, a tunable laser, to emit light of a plurality of wavelengths. A preferable laser is tunable using temperature variation. These wavelengths may be selected to be different from those wavelengths used in the PON for non-OTDR transmissions, for example the plurality of wavelengths are each greater than 1600 nm. The splitter module may also include OTDR detection module having at least one photo detector, for example a multi-modal photo detector. One or more optical taps may be present for capturing OTDR reflections and providing them to the OTDR detection module. In a preferred embodiment, the optical splitter, the cyclic AWG, and the at least one WDM coupler are formed on a single semiconductor chip such as a PIC (photonic integrated circuit) chip.

In another aspect, the present invention is a method of assessing the condition of access fibers in a PON including distributing light comprising a plurality of wavelengths to a plurality of cyclic AWG ports according to wavelength, combining the light on at least one cyclic AWG port on an access fiber of the PON, detecting reflection of the light from at least one of the cyclic AWG ports from the associated access fiber, and comparing the reflected light to a reference value to determine if a degradation of the associated access fiber has occurred. The generated light may include light of a plurality of wavelengths, each greater then 1600 nm.

In yet another aspect, the present invention is a PON including an OLT, an OTDR transmitter, an OTDR detector, and a splitter module having an optical splitter, a cyclic AWG, and at least one WDM coupler situated between the optical splitter and an access fiber of the PON. The OTDR detector may be located in an outside plant associated with the PON in a CO. In a preferred embodiment, the optical splitter, the cyclic AWG, and the at least one WDM coupler are formed on a single semiconductor chip such as a PIC chip.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed at a manner of providing for testing of the access (or "drop") fibers in a PON (passive optical network) that is more reliable and less costly than testing schemes currently in use. The present invention makes use of OTDR (optical time-domain reflectometry) testing in a novel configuration of PON components with the goal of alleviating some of the disadvantages associated with existing applications.

Figure 1:
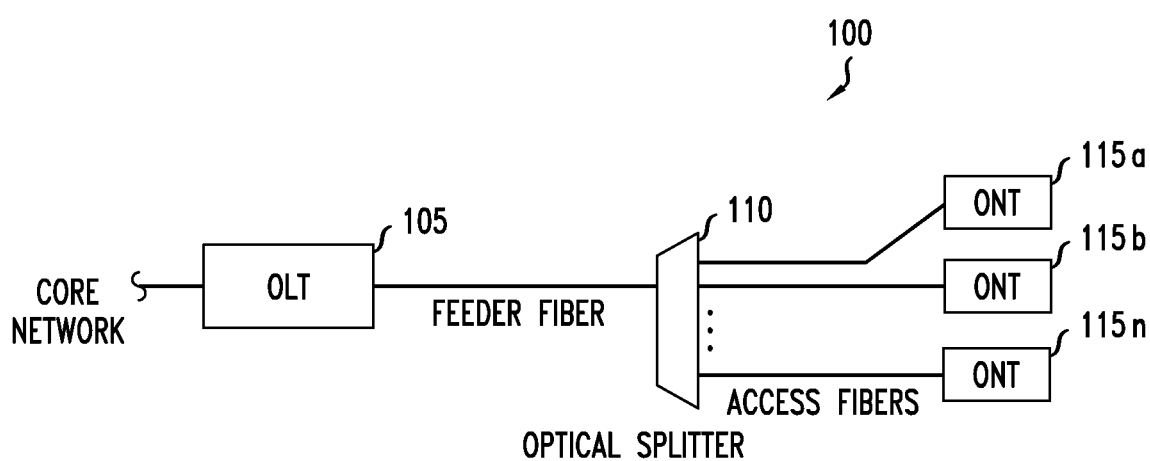
FIG. 1 is a simplified schematic diagram illustrating selected components of a typical PON according to the existing art.
Figure 2:
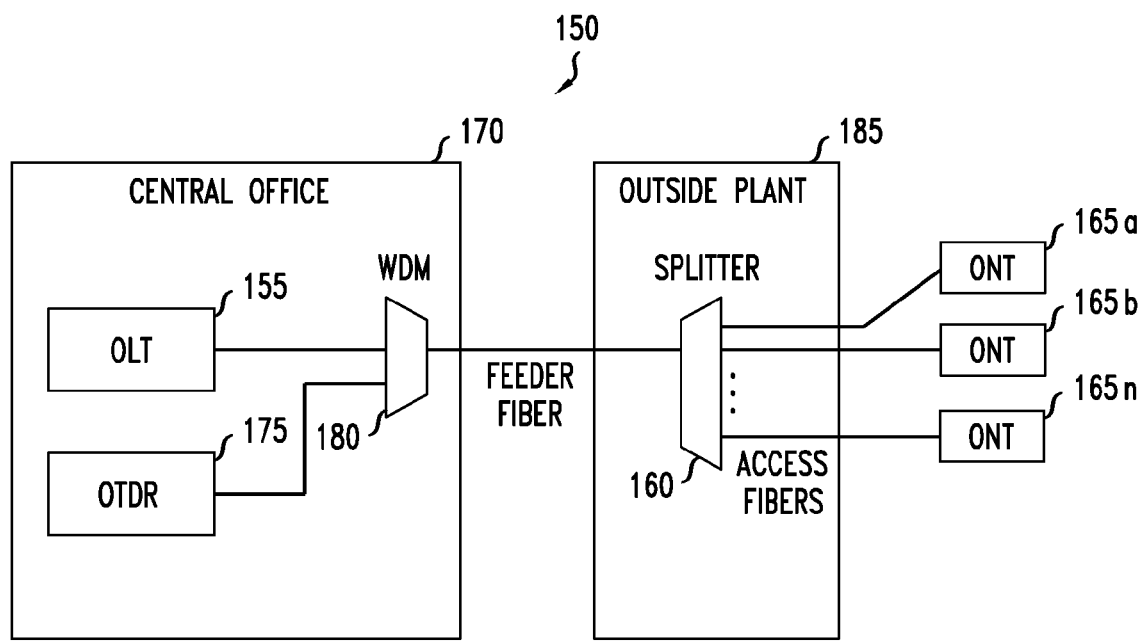
FIG. 2 is a simplified schematic diagram illustrating selected components of a typical PON according to the existing art.

As described above, in general terms a PON is an access network that includes an OLT (optical line terminal) located in a CO (central office) that communicates with a number of ONUs (optical network units—such as an ONT (optical network terminal)) via an optical splitter. FIG. 2 is a simplified schematic diagram illustrating selected components of a typical PON 150 according to the existing art. In PON 200 an OLT 155 or similar device is located in a CO 170 and handles the data traffic that is sent to and received from a number of ONTs 165a through 165n. As is typical, an optical splitter 160 communicates with the OLT 155 via a feeder fiber to the CO 170, and with ONTs 165a through 165n via a plurality of access fibers. Optical splitter 160 often resides in an outside plant 185, which may be a street cabinet, located some distance from the CO 170 and in the vicinity of the ONTs 165a through 165n.

In order to monitor the integrity of the PON fibers, an OTDR system 175 is also located in the CO 160. The OTDR system (hereinafter simply "OTDR") includes a light source and a light detector (not separately shown), respectively for sending an optical signal and receiving a reflected signal. OTDR 175 has or is in communication with a processor (also not shown) for analyzing the reflected signals to determine if there has been a break in one of the fibers or significant degradation in transmission quality.

As is typical, and shown in FIG. 2, fiber cable communication links connect OLT 155 and OTDR 175 to a WDM (wave division multiplexing) coupler 180, which is also connected to the feeder fiber for communicating with optical splitter 160. The transmitted OTDR light energy therefore travel along the feeder fiber from the WDM coupler 180 and pass through the optical splitter 160 in outside plant 185 en route to the ONTs 165a through 165n. Reflected light from the access fibers also follow this same basic path. While OTDR measurements of the reflected light may be made at CO 170, the losses associated with feeder fiber and splitter may exceed the capability of OTDR 175 to accurately detect any problems existing in the access fibers.

The present invention seeks to reduce or eliminate these and other disadvantages by deploying some or all of an OTDR system in the outside plant. Several configurations for implementation are described in reference to FIGS. 3 through 7.

Figure 3:
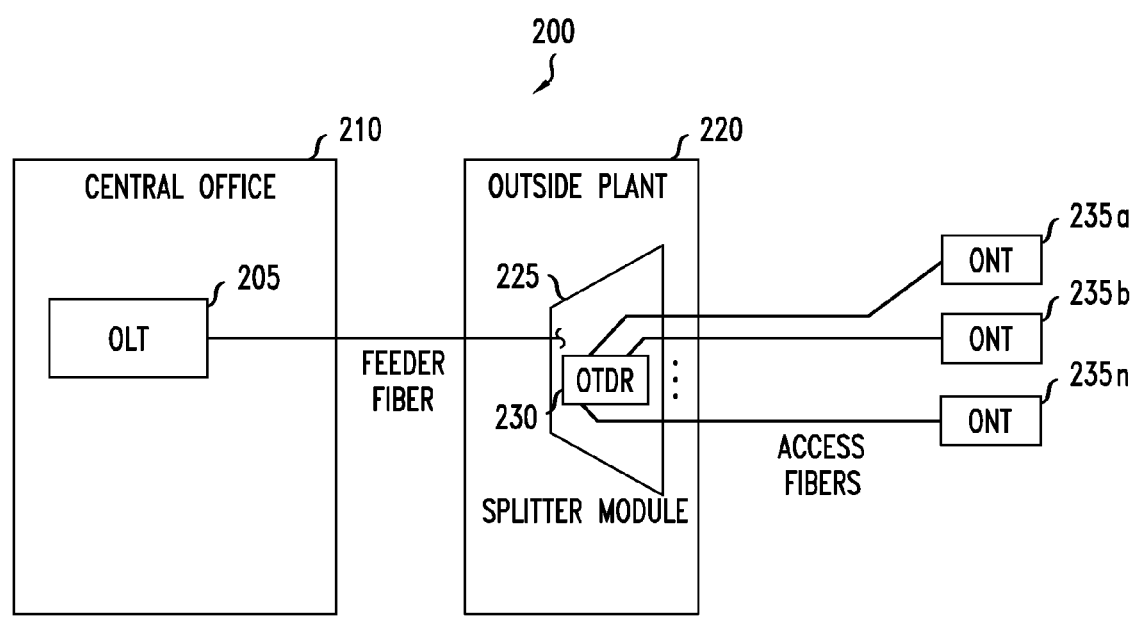
FIG. 3 is a simplified schematic diagram illustrating selected components of a splitter module according to an embodiment of the present invention.

FIG. 3 is a simplified schematic diagram illustrating selected components of a PON 200 according to an embodiment of the present invention. As should be apparent, many of the components of the PON 200 are arranged as may be found in a typical existing PON. The present invention is intended to be installable in many existing systems without undue modifications.

In the embodiment of FIG. 3, OLT 205 is located in CO 210 and interfaces with a core network (not shown) in the usual fashion. Data and other traffic are transmitted along a feeder fiber to and from ONTs 235a through 235n via an optical splitter module 225 located in outside plant 220. In accordance with this embodiment, an OTDR module 230 is located within the optical splitter module 230. Note that the exact configuration of OTDR module 230 may vary from one embodiment to the next, but in most embodiments this configuration permits OTDR testing of the access fibers without also including the feeder fiber and optical splitter that can contribute to the loss of signal strength seen in current OTDR applications. Note also that the OTDR module 230 may also be configured to perform OTDR testing of the feeder line itself, although this is not expected in most embodiments.

In FIG. 3, the components of the optical splitter module 220 are omitted for clarity. Selected splitter module components according to several embodiments of the present invention are shown in FIGS. 4 through 7.

Figure 4:
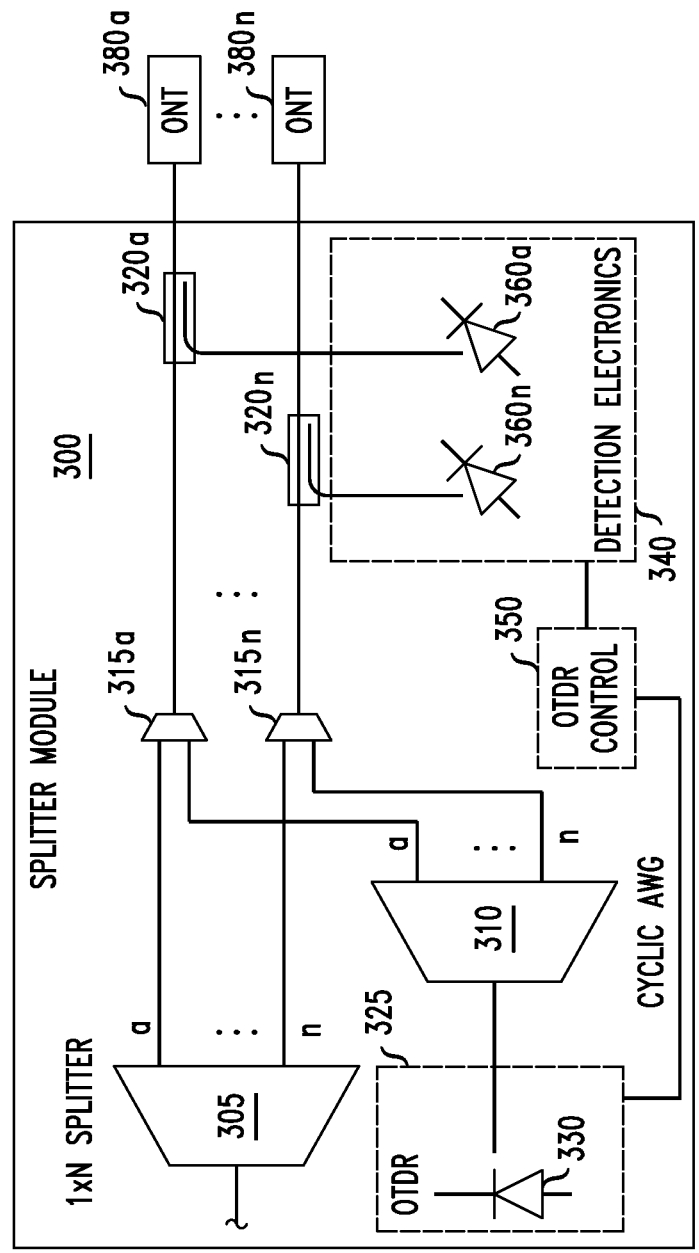
FIG. 4 is a simplified schematic diagram illustrating selected components of a splitter module according to another embodiment of the present invention.

FIG. 4 is a simplified schematic diagram illustrating selected components of a splitter module 30 according to another embodiment of the present invention. Splitter module 300 may be implemented, for example, in the outside plant 220 shown in FIG. 3. In the embodiment of FIG. 4, splitter module 300 includes an optical splitter 305. Optical splitter 305 has a single feeder port on the upstream side and multiple access ports a through n, two of which are depicted in FIG. 4, on the downstream side. Optical splitter 305 operates in the normal fashion to distribute downstream optical signals to ONTs 380a through 380n, and to collect upstream transmissions from the ONTs.

In this embodiment, the access or downstream ports are each linked to a respective WDM (wave-division multiplexing) combiners 315a through 315n. Again, there could be any number of such couplers even though only two are shown in FIG. 4. Also respectively linked to WDM combiners 315a through 315n are the downstream ports a through n of cyclic AWG (arrayed waveguide grating) 310.

In the embodiment of FIG. 4, the cyclic AWG receives its input from an OTDR transmitter 325, that is, a light source such as a laser. The OTDR transmitter 325 preferably produces light in a range of wavelengths using a temperature-controlled laser. The light is provided to the cyclic AWG 310, which outputs each wavelength on a respective one of its downstream ports a through n. Note that in this preferred embodiment a single light source 330 is used to generate all OTDR wavelengths.

In this embodiment, the access or downstream ports are each linked to a respective WDM (wave-division multiplexing) couplers 315a through 315n. Again, there could be any number of such couplers even though only two are shown in FIG. 4. Also respectively linked to WDM couplers 315a through 315n are the downstream ports a through n of cyclic AWG (arrayed waveguide grating) 310.

In this embodiment, the output of each of the ports a through n of cyclic AWG 310 is transmitted through a respective access fiber via one of the WDM couplers 315a through 315n. Because the WDM couplers also permit normal PON traffic between the optical splitter 305 and the ONTs 380a through 380n along the same access fibers, the respective wavelengths for each of these transmissions are preferably selected so they do not interfere with each other. For example, normal PON traffic could use a wavelength or wavelengths of less than 1600 nm, while OTDR transmissions may use wavelengths of greater than 1600 nm.

In this embodiment, the OTDR reflected light is captured for each access fiber by a respective one of optical taps 320a through 320n. Each of optical taps 320a through 320n is linked to detection module 340, which in this embodiment includes a photo detector 360a through 360n respectively associated with each of optical taps 320a through 320n.

OTDR control module 350 controls the operation of the OTDR transmitter 325 and the OTDR detection module 340. OTDR control module 350 is preferably implemented in hardware, though it may also be implemented in software executing on a hardware platform. In a preferred embodiment, some or all of the components of splitter module 300 are implemented on a single highly-integrated optical chip such as a PIC (photonic integrated circuit).

Figure 5:
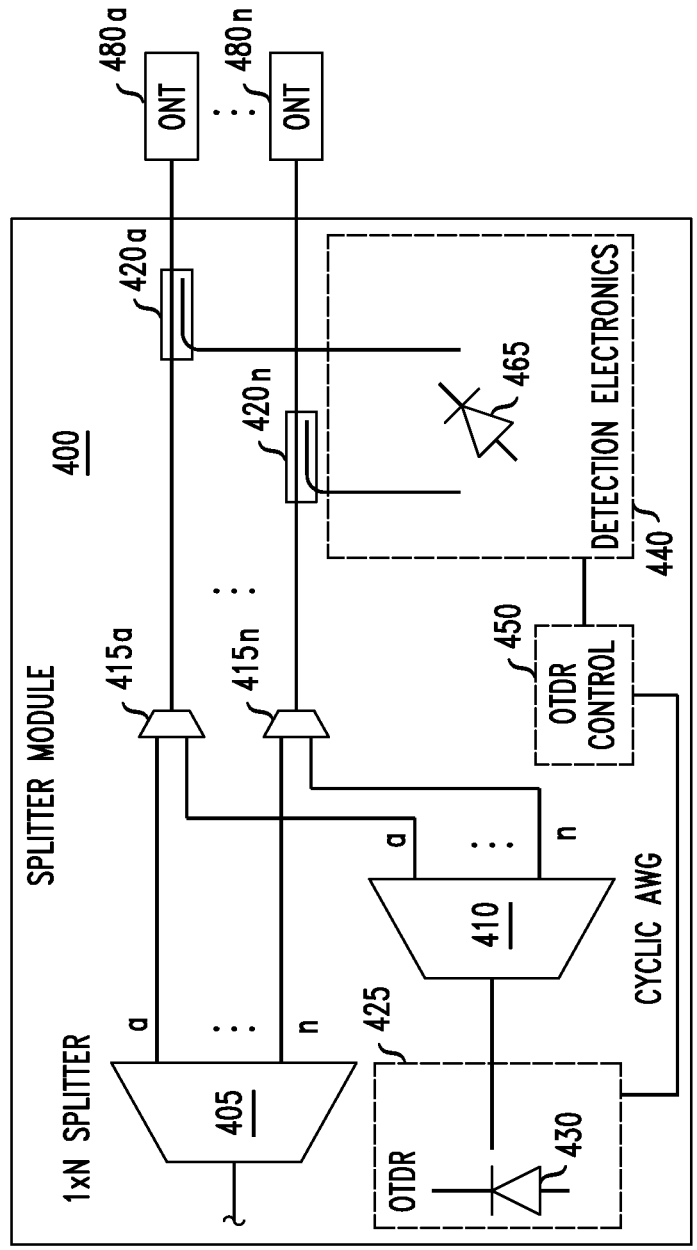
FIG. 5 is a simplified schematic diagram illustrating selected components of a splitter module according to another embodiment of the present invention.

FIG. 5 is a simplified schematic diagram illustrating selected components of a splitter module 400 according to another embodiment of the present invention. In this embodiment, similar to splitter module 300, described above, ports a through n of optical splitter 405 and of cyclic AWG 410 are linked to respective WDM couplers 415a through 415n. An OTDR transmitter 425 having a single tunable light source 430 generates light in varying wavelengths for assessing the access fibers leading to ONTs 480a through 480n.

In this embodiment, however, optical taps 420a through 420n are linked to a single photo detector 465 in detection module 440. It is expected that use of a single multi-modal detector may reduce total product cost. OTDR control 450 controls the operation of OTDR transmitter 425 and OTDR detection module 440.

Figure 6:
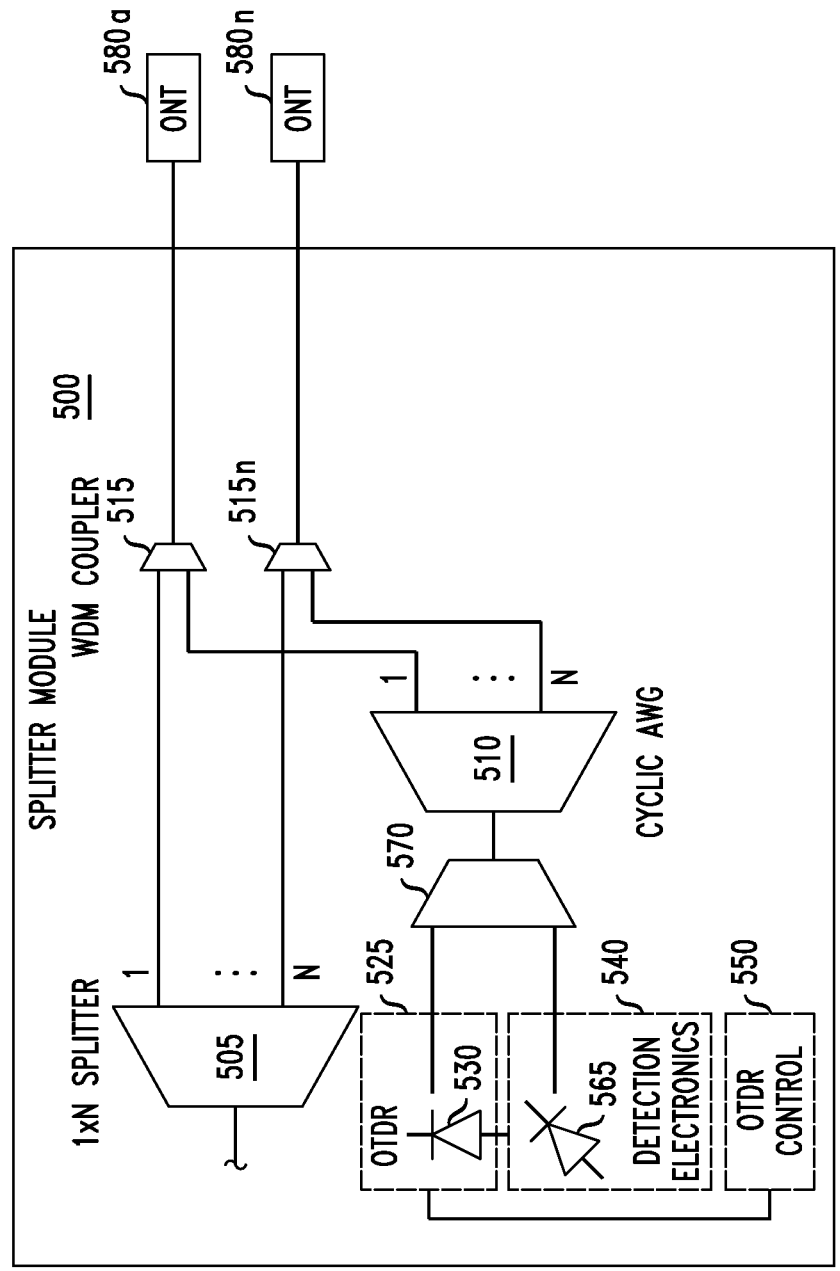
FIG. 6 is a simplified schematic diagram illustrating selected components of a PON according to another embodiment of the present invention.

FIG. 6 is a simplified schematic diagram illustrating selected components of a splitter module 500 according to another embodiment of the present invention. In this embodiment, similar to splitter modules 300 and 400, described above, ports a through n of optical splitter 505 and of cyclic AWG 510 are linked to respective WDM couplers 515a through 515n. An OTDR transmitter 525 having a single tunable light source 530 generates light in varying wavelengths for assessing the access fibers leading to ONTs 580a through 580n.

In this embodiment, however, a single photo detector 565 in detection module 540, which resides upstream of cyclic AWG 510 instead of using optical taps positioned downstream of WDM couplers 515a through 515n (as in, for example, splitter modules 300 and 400, described above). This may be preferable in some implementations to reduce the number of components needed in splitter module 500. A WDM coupler 570 is employed to permit the OTDR transmitter 525 and detection module 540 to share the link to cyclic AWG 510. Again, OTDR control 550 controls the operation of OTDR transmitter 525 and OTDR detection module 540.

Figure 7:
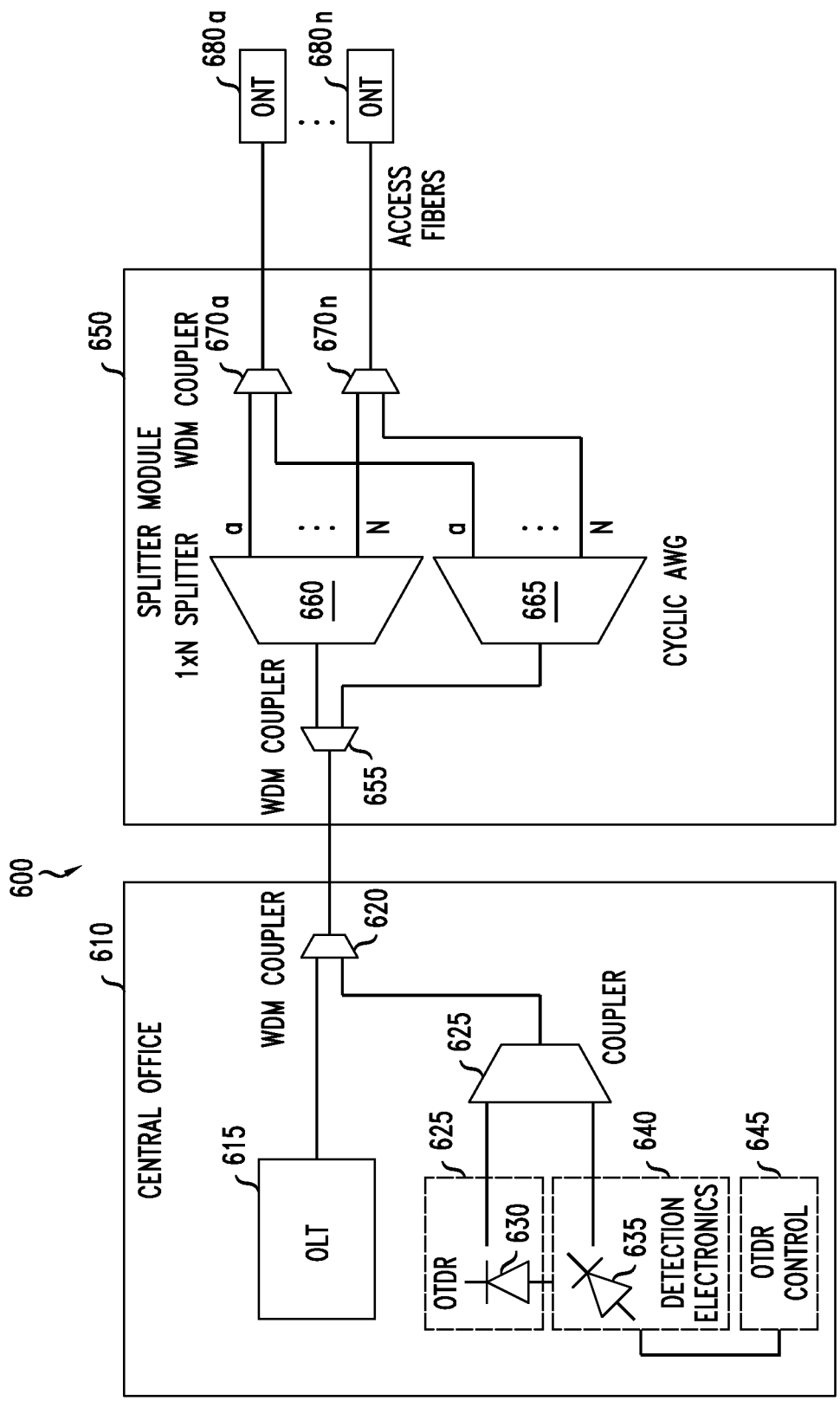
FIG. 7 is a simplified schematic diagram illustrating selected components of a PON according to another embodiment of the present invention.

FIG. 7 is a simplified schematic diagram illustrating selected components of a PON 600 according to an embodiment of the present invention. In this embodiment, the OTDR elements are implemented in the CO 610, simplifying the splitter module 650, which may be located in an outside plant (not separately shown in FIG. 7). OLT 615 communicates with ONTs 680a through 680n via splitter module 650.

In this embodiment of FIG. 7, splitter module 650 includes a 1×N optical splitter 660 that distributes downstream traffic from OLT 615 to ports a through n, and combines upstream traffic received from ONTs 680a through 680n for transmission along a single feeder fiber toward OLT 615. A cyclic AWG 665 selectively distributes OTDR light to its ports a through n. WDM couplers 670a through 670n combine the downstream light from optical splitter 660 and cyclic AWG 665 for propagation along respective individual access fibers.

In this embodiment, an OTDR transmitter 625 including a single light source 630 is located in the CO 610 along with OLT 615, as is detection module 640 including a single photo detector 635. As with the embodiments described above, photo detector 635 is preferably a multi-modal detector and light source 630 is preferably a tunable laser, such as one that may be tuned using heat or heating and cooling.

In the embodiment of FIG. 7, a WDM coupler 625 permits OTDR transmitted and reflected light to be propagated along a single link between coupler 625 and WDM coupler 620. WDM coupler 620 combines in the downstream direction optical transmissions from OLT 615 and OTDR light via coupler 625 for transmission along a single feeder fiber. Upon reaching splitter module 650, the combined light is distributed by WDM coupler 655 to the optical splitter 660 and the cyclic AWG 665. Again, it is preferred that the OLT 615 and the ODTR transmitter 625 propagate different wavelengths to avoid unwanted interference. (A possible less efficient alternative would be to also use time division multiplexing instead or in addition to using light at different wavelengths.) Again, OTDR control 645 controls the operation of OTDR transmitter 625 and OTDR detection module 640.

In this embodiment, the OTDR analysis is disadvantages by losses associated with the feeder fiber, but is still able to by-pass the optical splitter 660, yielding an advantage over systems presently in use.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A splitter module for a PON (passive optical network), comprising:
   an optical splitter;
   an OTDR transmitter comprising a light source
   a cyclic AWG (arrayed waveguide grating); and
   at least one WDM coupler for optically coupling an optical splitter communication link and a cyclic AWG communication link, wherein the at least one WDM coupler is situated downstream of both the optical splitter and the cyclic AWG.

2. The splitter module of claim 1, further comprising a feeder-side WDM coupler situated upstream of both the optical splitter and the cyclic AWG for distributing light propagated along a feeder fiber to the optical splitter and the cyclic AWG.

3. The splitter module of claim 1, wherein the light source is tunable to emit light of a plurality of wavelengths.

4. The splitter module of claim 3, wherein the plurality of wavelengths are selected to be different from those wavelengths used in the PON for non-OTDR transmissions.

5. The splitter module of claim 3, wherein the plurality of wavelengths are each greater than 1600 nm.

6. The splitter module of claim 3, wherein the light source is a tunable laser.

7. The splitter module of claim 6, wherein the tunable laser is tunable using temperature control.

8. The splitter module of claim 1, further comprising an OTDR detection module comprising at least one photo detector.

9. The splitter module of claim 8, wherein the at least one photo detector comprises a multi-modal photo detector.

10. The splitter module of claim 9, wherein the at least one photo detector is a single multi-modal photo detector.

11. The splitter module of claim 8, further comprising at least one optical tap for capturing OTDR reflections and providing them to the OTDR detection module.

12. The splitter module of
   claim 1 further comprising a coupler linked to both the OTDR transmitter and the OTDR reflector and situated between them and the cyclic AWG.

13. The splitter module of claim 1, wherein the optical splitter, the cyclic AWG, and the at least one WDM coupler are formed on a single semiconductor chip.

14. The splitter module of claim 13, wherein the semiconductor chip is a PIC.

15. A PON, comprising:
   an OLT
   an OTDR transmitter;
   an OTDR detector; and
   a splitter module comprising:
      an optical splitter;
      a cyclic AWG; and
      at least one WDM coupler situated between the optical splitter and an access fiber of the PON;
   wherein the OTDR detector, the optical splitter, the cyclic AWG, and the at least one WDM coupler are formed on a single semiconductor chip.

16. The PON of claim 15, wherein the OTDR transmitter is co-located with the OLT in a CO.

17. The PON of claim 15, wherein the OTDR detector is co-located with the OLT in a CO.

18. The PON of claim 15, wherein the splitter module is located in an outside plant.

19. The PON of claim 18, wherein the OTDR transmitter is located in the outside plant.

20. The PON of claim 18, wherein the OTDR detector is located in the outside plant.

\* \* \* \* \*